United States Patent [19]

Typpo

[11] Patent Number: 4,791,367
[45] Date of Patent: Dec. 13, 1988

[54] CONTACTING THICKNESS GAUGE FOR MOVING SHEET MATERIAL

[75] Inventor: Pekka M. Typpo, Cupertino, Calif.

[73] Assignee: Impact Systems, Inc., San Jose, Calif.

[21] Appl. No.: 73,734

[22] Filed: Jul. 15, 1987

[51] Int. Cl.$^4$ .............................................. G01B 7/10
[52] U.S. Cl. .................................... 324/229; 324/236
[58] Field of Search ............... 324/229, 230, 231, 234, 324/236

[56] References Cited

U.S. PATENT DOCUMENTS

| | | | |
|---|---|---|---|
| 2,563,254 | 5/1948 | Lewis | 324/229 |
| 3,258,686 | 6/1966 | Selgin | 324/230 |
| 3,828,248 | 8/1974 | Wennerberg | 324/34 TK |
| 4,005,359 | 1/1977 | Smoot | 324/230 |
| 4,107,606 | 8/1978 | Typpo et al. | 324/229 |

*Primary Examiner*—Reinhard J. Eisenzopf
*Assistant Examiner*—Anthony L. Miele
*Attorney, Agent, or Firm*—Flehr, Hohbach, Test, Albritton & Herbert

[57] ABSTRACT

A contacting thickness gauge for measuring the caliper of paper includes a U-shaped pole piece on one side of the paper with a return path being provided by a simple ferrite slab on the other side where the magnetic reluctance of the gaps provides a measure of the caliper. The pole piece has one leg of relatively small diameter contacting the paper; the other larger leg of the U-shaped pole piece being spaced from the paper by either jewel or air bearings to minimize the contact with the sensitive surface of the moving sheet material. The area ratio provides for an insensitivity of the gap of the large leg. In addition, the stray self inductance of the windings is eliminated due to the use only of a mutual inductance measurement to determine the final resonant frequency which is a measurement of the caliper.

4 Claims, 7 Drawing Sheets

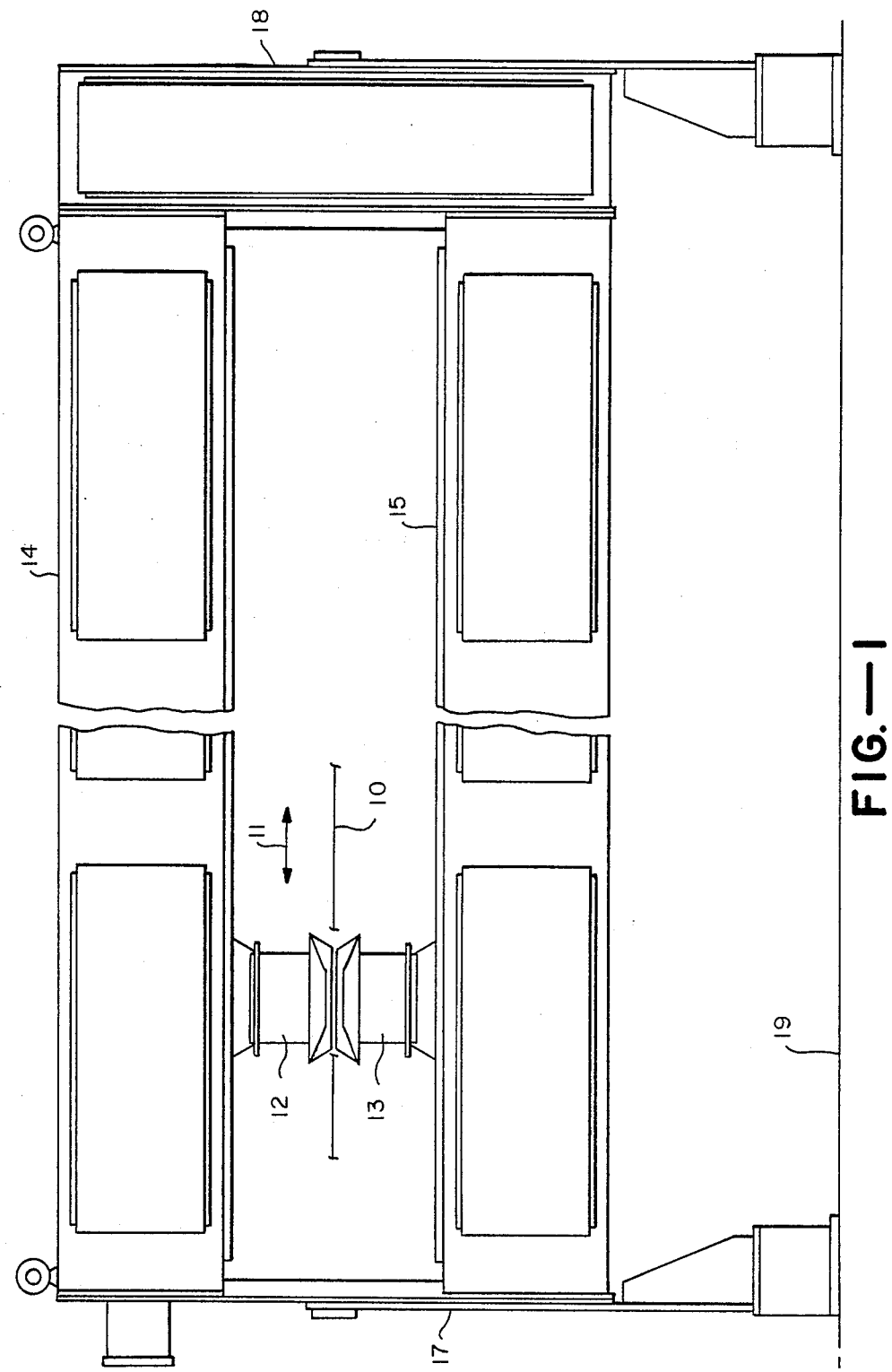
FIG.—1

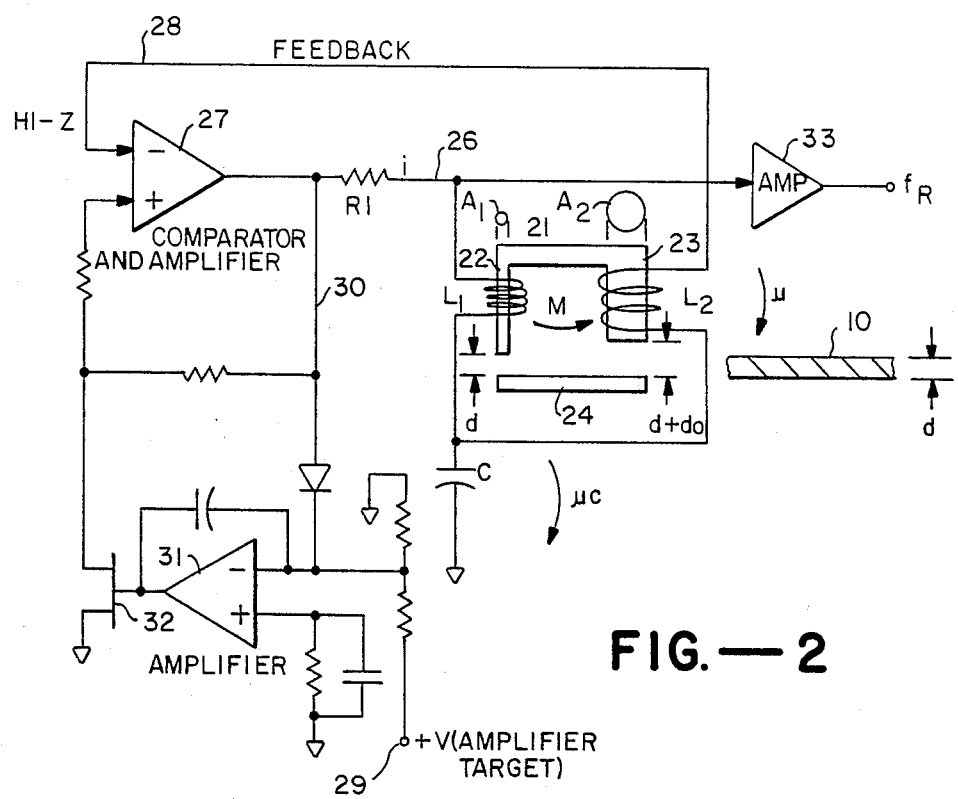
FIG.—2
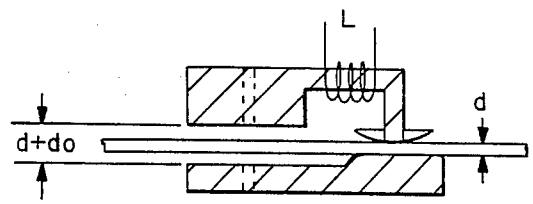
FIG.—3
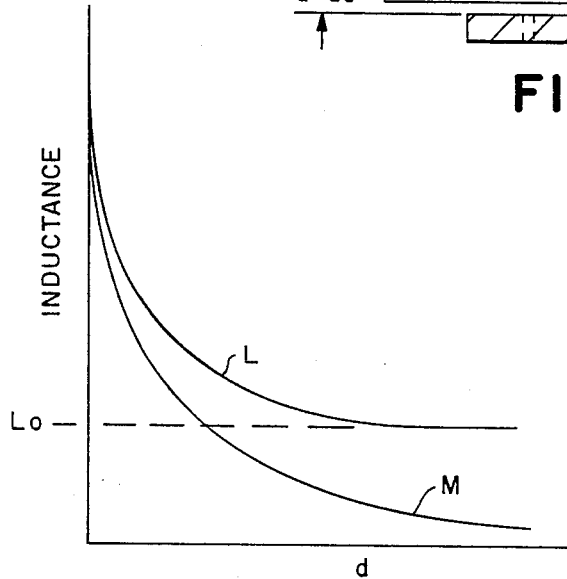
FIG.—4

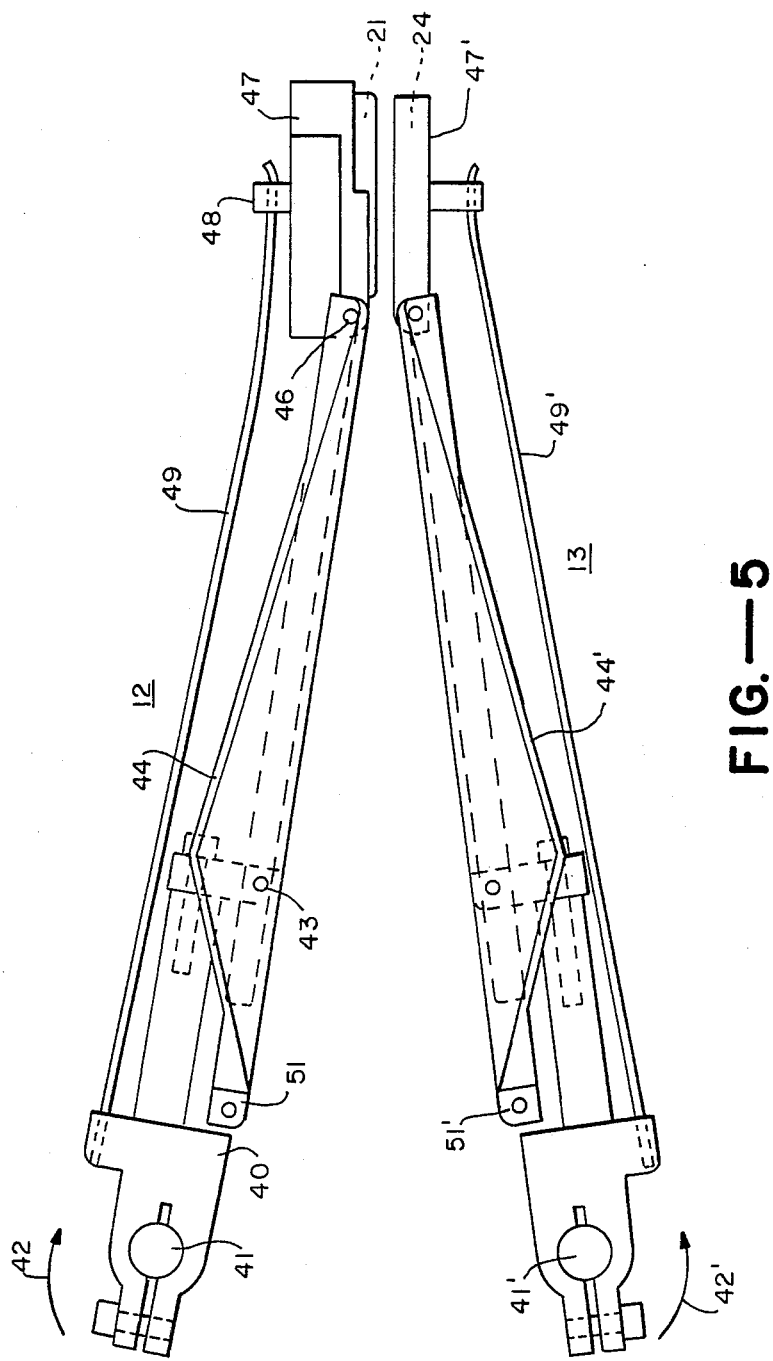
FIG.—5

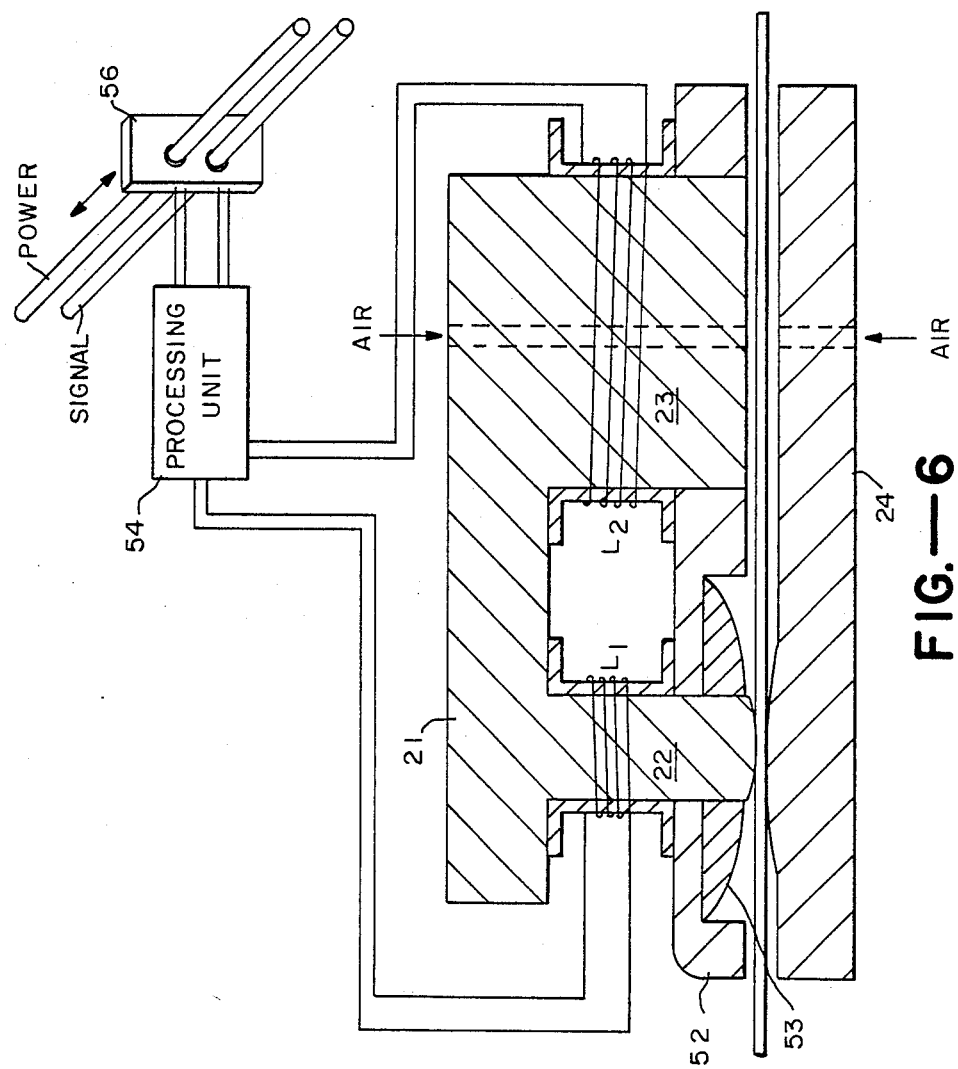
FIG.—6

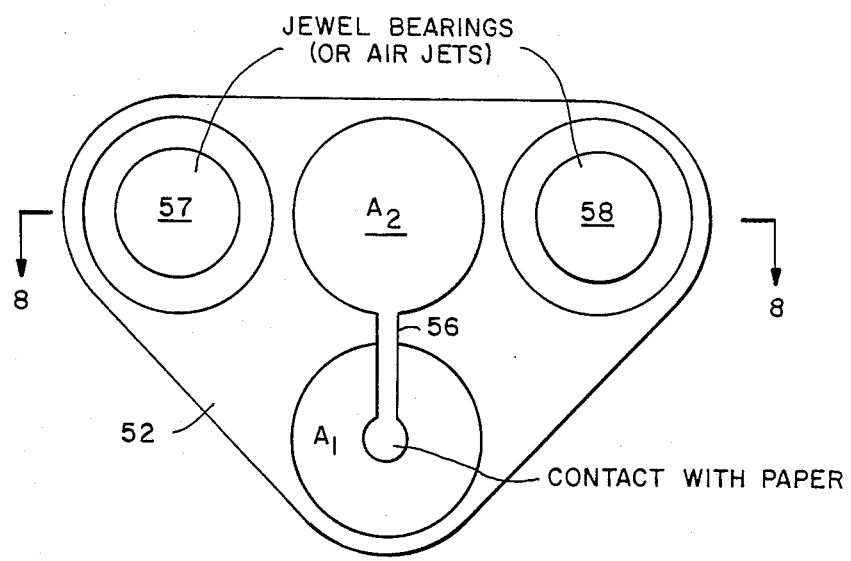
FIG.— 7
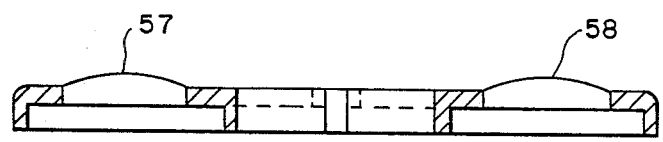
FIG.— 8

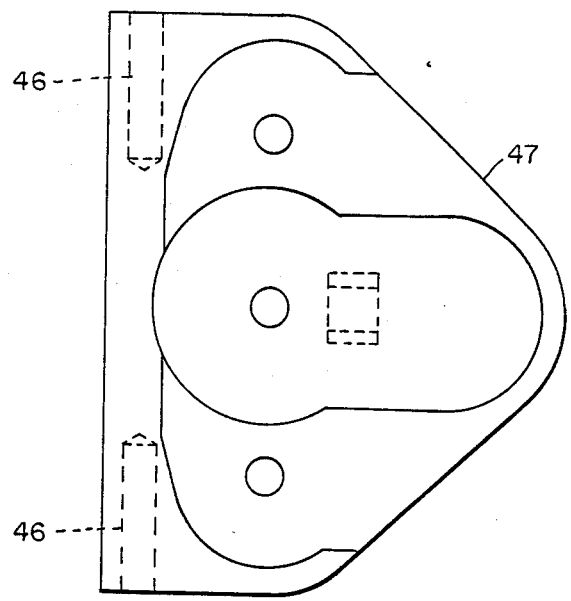
FIG.—9A
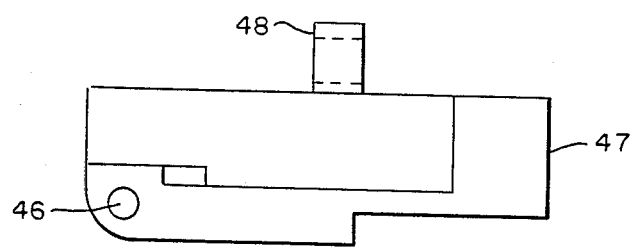
FIG.—9B

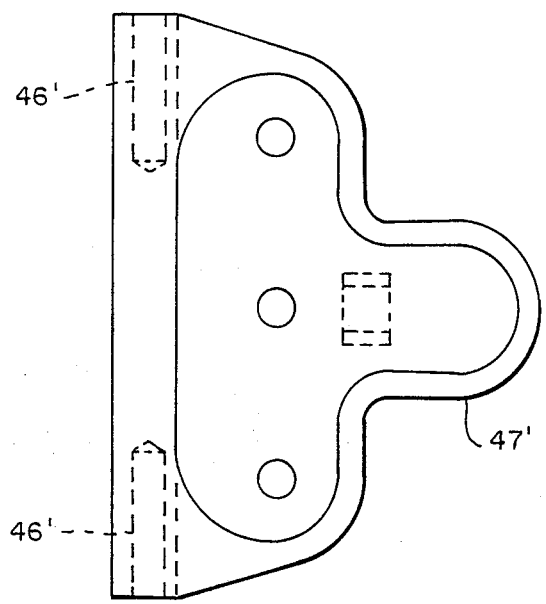
FIG.—10A
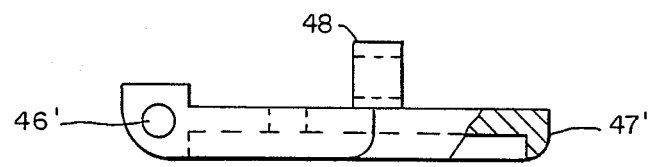
FIG.—10B

CONTACTING THICKNESS GAUGE FOR MOVING SHEET MATERIAL

The present invention is directed to a contacting thickness gauge for moving sheet material, and more particularly to measuring the caliper of paper.

BACKGROUND OF THE INVENTION

In the measurement of caliper of paper, caliper gauges have been of both the contacting and non-contacting types. Contacting gauges are perhaps more reliable but because they bear against the sheet material (which is perhaps fluttering and shifting) may cause ripping or other unwanted effects. On the other hand, the non-contacting gauge which, for example, might utilize air jets to space the gauge from the surface of the moving paper, is less reliable and in general, less accurate.

Both contacting and non-contacting gauges use the general concept of measurement of the reluctance of a magnetic flux path through pole pieces of the gauge which is made of magnetic material, with the gap between the gauge varying according to caliper of the paper. This also changes the inductance of the circuit and when such inductance is placed in a resonant circuit with a capacitor, the resonant frequency is thus indicative of variation in the gap, which is proportional to the caliper of the paper.

In addition to the above difficulties in making a choice between a contacting and non-contacting gauge with the disadvantages of each, in general the inductive technique of measurement may not provide satisfactory sensitivity at some paper thicknesses.

OBJECT AND SUMMARY OF THE INVENTION

It is therefore the general object of the present invention to provide an improved contacting thickness gauge for moving sheet material.

In accordance wih the above object, there is provided a contacting thickness gauge for moving sheet material which comprises active magnetic means on one side of the sheet and juxtaposed passive magnetic means on the other side of the sheet for providing a magnetic flux path through the sheet. The active magnetic means include a U-shaped pole piece having two legs juxtaposed with the sheet and the passive magnetic means.

In one aspect of the invention a pair of windings are respectively wound around each leg and form a resonant circuit with the circuit having a resonant frequency determined substantially solely by the mutual inductance between the windings, excluding the stray inductance of the windings themselves. From another related aspect one of the legs of the U-shaped pole piece has a much smaller cross-section than the other leg and means are provided for biasing the smaller leg into contact with the sheet material, maintaining the other leg spaced from the sheet.

DESCRIPTION OF THE DRAWINGS

FIG. 1 is an elevation view of the overall apparatus of the present invention as it would be installed in the path of a paper making machine.

FIG. 2 is a simplified circuit schematic showing components that are installed in the apparatus of FIG. 1.

FIG. 3 is a simplified cross-sectional view of an alternative embodiment of FIG. 2.

FIG. 4 is a graph useful in understanding the operation of the invention.

FIG. 5 is an elevation view showing components of FIG. 1 which contact the moving sheet material.

FIG. 6 is an enlarged cross-sectional view of a portion of FIG. 5, which has been simplified.

FIG. 7 is a plan view in greater detail of a portion of FIG. 6 showing the active magnetic portion of the invention.

FIG. 8 is a cross-sectional view taken along the line 8—8 of FIG. 7.

FIGS. 9A and 9B are plan and side views of a cover-type component in which the part of FIG. 7 is inserted and which is also illustrated in FIG. 5.

FIGS. 10A and 10B are cover-type components for a part of the passive magnetic part of FIG. 6, which is also illustrated in FIG. 5.

DESCRIPTION OF PREFERRED EMBODIMENT

Referring to FIG. 1, the thickness or caliper gauge of the present invention is used in conjunction with a scanner which traverses across the moving paper 10, which is being produced by a paper making machine. Scanning is in the direction as indicated by the double ended arrow 11 and is accomplished by an upper scanning head 12 and a lower scanning head 13. The gap between the scanning heads accommodates the moving paper 10. The scanning heads are mounted for traversal in the direction 11 from a frame consisting of upper and lower beams 14 and 15, with side supports 17 and 18, having legs affixed to the floor 19.

FIG. 2 illustrates the overall circuit and physical components of the scanning gauge which are encompassed in the upper and lower heads 12 and 13, as illustrated in FIG. 1. In general, the upper head 12 includes the active magnetic circuit and the lower head 13 the passive. Specifically, the active magnetic circuit includes a U-shaped magnetic (ferrite) pole piece 21 having the legs 22 and 23. The ends of the legs with the respective areas $A_1$ and $A_2$ are facing and juxtaposed with the sheet material 10. Leg 22 in fact is in contact with the sheet material, and the leg 23 is maintained out of contact with the sheet material by means of physical or air jet bearings, as will be described below.

Lower head 13 (FIG. 1) contains the passive magnetic circuit which is merely an elongated slab of magnetic or ferrite material 24 placed on the other side of sheet 10. Thus, the flux path which is established extends through the pole piece 21 through the paper and then the return piece 24. Passive pole piece 24 is always in contact with the moving paper 10, as is the pole leg 22. Thus, the gap between them is actually the caliper, d, of the paper 10. On the other hand, the pole piece 23 is held away from the paper and thus the spacing is caliper, d, in addition to the additional air gap designated $d_0$.

The cross-sectional areas of the legs 22 and 23 designated $A_1$ and $A_2$ have in the present invention the ratio of 1:16; in other words, the contacting leg 22 has a much smaller area then the non-contacting leg 23. This has the advantage, as will be shown by mathematical proof below, that the air gap $d_0$ has only a second order effect on the measurement of the gap of the caliper, d. Thus is provided one of the advantages of the invention in that only a relatively small diameter component is in contact with the moving paper. This is believed to minimize scratching or breakage of the moving sheet material 10.

Around each leg 22 and 23 is a winding respectively L1 and L2 which is utilized to generate the flux path through pole pieces 21 and 24. L1 and L2 are connected together and to a common through a capacitor C. Winding L1 is driven via a line 26 from a comparator-/amplifier 27 by an a.c. constant current, designated i (whose amplitude is held substantially constant). This constant current results from voltage output of amplifier 27 being across resistor R1 with the remainder of the circuit, L1 and C, having a relatively low impedance. It flows through L1 and then through the capacitor to common.

No current is diverted to L2, since L2 is returned to a high impedance input, so designated, to comparator-/amplifier 27. This is a feedback path 28 which provides oscillation at a resonant frequency which, as will be proved below, is determined by the mutual inductance between the windings L1 and L2 designated 'M' and the capacitance of capacitor C.

The other polarity input of comparator 27 is driven by an amplitude target unit which controls the final amplitude of the output of comparator 27 by means of an amplitude target input at 29, which drives an operational amplifier 31, whose output drives a field effect transistor 32, which in turn extends to the positive polarity input of amplifier 27. The other input of amplifier 31 receives the voltage output from amplifier 27 on line 30. The constant current output of amplifier 27, on line 26, provides a final output frequency designated $f_R$ via amplifier 33.

The operation of the circuit of FIG. 2 is best illustrated with reference to the equations infra of this specification. Referring to equation 1, the mutual inductance which, as discussed above—in combination with capacitor C determines the resonant frequency and thus is a measure of the gap d—is determined by the factors shown in equation 1 which are defined as follows:

$A_1$—the area of the small pole leg 22
$A_2$—the area of the large pole leg 23
$N_1$ and $N_2$—the number of turns in the coils L1 and L2
d—the caliper
$d_0$—the additional air gap at the leg 23
A—the effective cross-section of the flux path in the core or pole piece 21
$\mu_0$—a natural constant
$\mu_r$—the relative permeability of the magnetic or ferrite pole piece 21
l—the length of the flux path in the pole piece 21 and return path 24

Since the area $A_2$ is much larger than $A_1$, the $d_0$ term in equation 1 may be neglected or treated as a constant. In addition, the $\mu_r$ term is typically over 5,000 and may be a constant also. Thus, equation 1 may be written as equation 2 with the two above terms replaced by a K factor.

Equation 2a is equivalent to equation 2 but covers the situation of FIG. 3, which is an alternative embodiment where rather than two windings L1 and L2, there is merely a single winding L. Here however the stray inductance $L_0$ would be a factor. It is noted that where mutual inductance is utilized as the resonance determining inductance, that stray inductance is eliminated, thus eliminating a significant error in the computation.

However, if the caliper d is small, the stray inductance is not significant. If it is large, it becomes significant and thus this does limit the accuracy.

The foregoing is illustrated by the curves of FIG. 4 where the caliper d versus mutual inductance M and inductance L (including the effect of stray inductance $L_0$) is indicated. Thus, for the larger calipers, d, it is obvious that the L curve levels off or is asymptotic to the stray inductance $L_0$. Thus, the use of mutual inductance provides a significantly wider or more sensitive measurement range.

Still referring to the equation of FIG. 2 and also the equations page, equation 3 shows that the voltage U across the winding L2 is determined by mutual inductance and the current flowing through L1. There is no current through L2 because of the high impedance input to amplifier 27. The opposite voltage $\mu_c$, as illustrated in equation 4, is determined by the same current i and capacitance C. A combination of these two voltages, which must have a net of zero for resonance, is shown in equation 5; equation 6 shows a resonance condition. Equation 7, therefore, states that the resonant frequency $f_R$ is determined solely by the mutual inductance M (and not by the stray inductance $L_0$). And then equation 8 (which is a substitution of equations 2 in 7) determines the final caliper, d. And this d is in effect from the curve, as illustrated in FIG. 4, of the mutual inductance, M.

The above mutual inductance technique is accomplished with all the active magnetic portions on one side of the paper, thus, greatly simplifying construction: sensitivity is also significantly improved. This mutual inductance technique will work with the pole pieces or legs 21 and 23 of equal size, and either both contacting or both non-contacting the paper. And in fact to provide a measure of mutual inductance, different circuits are possible.

The advantage of utilizing a small contacting area $A_1$ and a large non-contacting area $A_2$ is that all components but the small contacting area $A_1$ can be supported by jewel or air bearings which provide an extremely light touch. This is especially important for sensitive paper grades, such as super calendar grades. Yet accuracy is still maintained since, as shown in equation 1, error is minimized due to the variations in spacing or gap in the non-contacting pole piece or leg 23.

FIG. 5 illustrates the pivoted arms which are actually hidden or enclosed within the upper gauging head 12 and the lower gauging head 13, and which carry the pole piece 21 and the passive magnetic means or pole piece 24. Referring to the active magnetic means carrying pole piece 21, the arm 4D is pivoted at 41 which is fixed to the upper scanning head 12. It is biased in a direction toward the moving sheet, as illustrated by the arrow 42. Arm 40 and its end provides another pivot point 43 for another arm 44 on which is pivoted at 46 the housing 47 for the U-shaped pole piece 21. A U-shaped bracket 48 on this upper housing or cover 47 provides for the attachment of a leaf spring 49. At the ends of arm 44 there is also included a counter weight 51. Primed numbers designate similar components in lower head 13.

FIG. 6 illustrates and simplifies in greatly expanded format the active or upper pole piece 21 and the lower pole piece 24 illustrated in FIG. 2. Here the windings L1 and L2 are more fully shown around the legs 22 and 23. This pole piece 21 is then inserted in a flat bracket 52 which, in the preferred embodiment, retains a jewelled bearing 53 in which the leg 22 is inserted and also the jewel bearings which maintain the leg 23 spaced from the moving paper. The windings L1 and L2 are shown as coupled to a processing unit 54, which contains all of the circuitry illustrated in FIG. 2 and then via a pickup 56, power and signal lines are indicated which are located along the length of the upper horizontal beam 14 of the scanning unit, as illustrated in FIG. 1.

FIG. 6 also illustrates an alternative embodiment where air bearings may be used instead of jewel bearings for the leg 23. This is indicated by the dashed lines designated AIR.

FIG. 7 illustrates in greater detail the support structure 52 in which the pole piece 21 is inserted. It includes apertures for the large leg 23 designated $A_2$ and for the smaller leg $A_1$. A gap 56 prevents undesirable magnetic shunting. The jewel bearings are shown at 57 and 58 for spacing the end of leg 23 away from the moving sheet material. The housing or cover 47 into which the assembled structure of FIG. 7 is inserted is shown in FIGS. 9A and 9B. This includes the U-shaped spring holder 48 and the pivot point 46. Finally, the housing 47' for the passive portion 24 is illustrated in FIGS. 10A and 10B with the same U-shaped bracket 48' and the pivot point 46'.

Thus the present invention provides an improved caliper gauge with the small/large area poles which have an area ratio, for example, of greater than 10:1. Allowing only the smaller pole to be in contact with the moving sheet is especially important with more sensitive papers. The foregoing area ratio makes the larger pole piece area and its air gap a relatively second order effect as far as the caliper measurement. At the same time, the fact that all of the active magnetic means are on one side of the paper and there is a very simple return path on the other side of the paper makes construction and alignment very simple. In addition, the invention provides either separately or in combination a mutual inductance measurement to eliminate errors due to the stray inductance of the coils.

$$M = \frac{\mu_0 A_1 N_1 N_2}{d\left(1 + \frac{A_1}{A_2}\right) + d_0\left(\frac{A_1}{A_2}\right) + \left(\frac{lA_1}{\mu_r A}\right)} \quad (1)$$

$$M = \frac{\mu_0 A_1 N_1 N_2}{d\left(1 + \frac{A_1}{A_2}\right) + K} \quad (2)$$

$$L = \frac{\mu_0 A_1 N^2}{d\left(1 + \frac{A_1}{A_2}\right) + K} + L_0 \quad (2a)$$

$$\mu = j\omega M i \quad (3)$$

$$\mu_c = \frac{i}{j\omega c} \quad (4)$$

$$\mu + \mu_c = i\left(j\omega M - \frac{j}{\omega c}\right) \quad (5)$$

at resonance $\omega M = \frac{j}{\omega c}$ \quad (6)

$$\therefore M = \frac{1}{\omega^2 C} = \frac{1}{4\pi^2 f_R^2 C} \quad (7)$$

substituting $d$(caliper) = $Xmm$. (7) in (2) \quad (8)

What is claimed:

1. A contacting thickness gauge for moving sheet material comprising:
    active magnetic means on one side of said sheet and juxtaposed magnetic means on the other side of said sheet for providing a magnetic flux path through said sheet;
    said active magnetic means including a U-shaped pole piece having two legs juxtaposed with said sheet and said passive magnetic means;
    a pair of windings respectively wound around said two legs;
    resonant circuit means including said pair of windings, said circuit means having a resonant frequency determined substantially solely by mutual inductance between said windings, excluding stray inductance of the windings themselves, said resonant frequency being proportional to the gaps between said two legs and said passive magnetic means;
    and means for biasing one of said two legs into contact with said sheet material, but maintaining said other of said two legs spaced from said sheet material, said contacting one leg having a cross-section much smaller than that of said other leg whereby the gap between the end of the non-contacting other leg and said passive magnetic means is relatively insensitive relative to said flux path.

2. A gauge as in claim 1 wherein said resonant circuit means includes capacitor means connected to said two windings and a high input impedance amplifier in a feedback path from one of said windings to the other.

3. A contacting thickness gauge for moving sheet material comprising:
    active magnetic means on one side of said sheet and juxtaposed passive magnetic means on the other side of said sheet for providing a magnetic flux path through said sheet;
    said active magnetic means including a U-shaped pole piece having two legs juxtaposed with said sheet and said passive magnetic means, one leg having a cross-section much smaller than the other leg;
    means for biasing said one smaller leg into contact with said sheet material, but maintaining said other leg spaced from said sheet;
    means including at least one winding on said pole piece for measuring the gaps between said two legs and said passive magnetic means.

4. A gauge as in claim 3 where the area ratio of said cross-sections of said two legs is greater than 10/1 whereby said gap of said spacing of said other leg from said sheet (which is not in contact with said sheet) is a second order effect for said measuring means relative to said gap of said contacting one leg.

* * * * *